(12) United States Patent
Zhu et al.

(10) Patent No.: US 11,814,516 B2
(45) Date of Patent: Nov. 14, 2023

(54) APPLICATION OF LIGNIN IN PREPARING RADIAL TIRE

(71) Applicant: NANJING TECH UNIVERSITY, Nanjing (CN)

(72) Inventors: Chenjie Zhu, Nanjing (CN); Hanjie Ying, Nanjing (CN); Ming Li, Nanjing (CN); Pingkai Ouyang, Nanjing (CN); Jiannong Shen, Nanjing (CN); Xinjian Xu, Nanjing (CN); Wei Zhuang, Nanjing (CN); Tao Shen, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 291 days.

(21) Appl. No.: 17/305,327

(22) Filed: Jul. 5, 2021

(65) Prior Publication Data

US 2021/0332222 A1  Oct. 28, 2021

(30) Foreign Application Priority Data

Jul. 8, 2020 (CN) .......................... 202010650027.0

(51) Int. Cl.
*C08L 7/00* (2006.01)
*B60C 1/00* (2006.01)

(52) U.S. Cl.
CPC .............. *C08L 7/00* (2013.01); *B60C 1/0041* (2013.01)

(58) Field of Classification Search
CPC .................................. C08L 7/00; B60C 1/0041
See application file for complete search history.

(56) References Cited

U.S. PATENT DOCUMENTS 8,664,305 B2 * 3/2014 Benko ...................... C08H 6/00
                                                                524/495
2020/0399448 A1 * 12/2020 Tahon ....................... C08L 7/00

* cited by examiner

*Primary Examiner* — Angela C Scott
(74) *Attorney, Agent, or Firm* — CBM PATENT CONSULTING, LLC

(57) ABSTRACT

The invention belongs to the field of rubber tire processing, and particularly discloses an application of a lignin in preparing a radial tire, wherein the lignin is capable of completely or partially replacing resorcinol, and meanwhile, the lignin is also capable of completely or partially replacing an anti-aging agent. Compared with the prior art, the resorcinol is replaced or partially replaced by a biomass-derived lignin or a modified lignin in the invention, so that requirements of cost reduction, environmental protection and no toxicity are satisfied. Especially, the lignin modified by demethylation according to the invention is capable of effectively enhancing various properties of rubber.

10 Claims, No Drawings

APPLICATION OF LIGNIN IN PREPARING RADIAL TIRE

TECHNICAL FIELD

The present invention belongs to the field of rubber tire processing, and more particularly, relates to an application of a lignin in preparing a radial tire.

BACKGROUND

As an important part of an automobile, a tire is a foundation of developing an automobile industry. A tire industry, as an important supporting industry of the automobile industry, is closely related to the economic development in China. In the past five years, a sales volume of an automobile tire market in China has grown significantly with a compound annual growth rate of 9.1%, from 396.0 million in 2012 to 561.2 million in 2016. Sales volumes of all-steel radial tires, semi-steel radial tires, and bias tires have been increased at a compound annual growth rate of 2.1%, 13.5% and −0.3%, respectively. It is predicted that the sales volume of the semi-steel radial tires will reach 594.5 million by 2021, with a compound annual growth rate of 8.8%; and the sales volume of the all-steel radial tires is expected to reach 181.9 million, with a compound annual growth rate of 2.1%. It can be seen that with the continuous improvement of safety awareness and expanding demands for tire products with a higher quality and a better property, the sales volume of the bias tires is adversely affected and is expected to be decreased continuously in the near future, while the demands for the all-steel radial tires and the semi-steel radial tires are increased.

At present, resorcinol is widely used in a rubber formula of a radial tire carcass. The resorcinol has a good effect, but is easy to be sublimated during high temperature mixing, resulting in volatilization of the resorcinol, smoking and certain toxicity. Therefore, preparing the radial tire with the resorcinol as a raw material not only brings serious environmental pollution to mixing and other processes of a rubber material, but also harms the health of staffs. In the prior art, to solve the technical problems, meta-methyl resin is usually used to replace the resorcinol, but a property of the radial tire prepared by using the meta-methyl resin may be reduced, which cannot achieve the same effect as that of the resorcinol. Therefore, using an environmental protection material has become an inevitable trend in the development of the radial tire.

SUMMARY OF INVENTION

Objective of the present invention: a technical problem to be solved by the present invention is to provide an application of a lignin in preparing a radial tire aiming at the defects in the prior art.

To solve the above technical problem, the present invention discloses an application of a lignin in preparing a radial tire.

The lignin completely or partially replaces resorcinol.

The lignin completely or partially replaces an anti-aging agent.

In parts by weight, an amount of the lignin is 2 parts to 25 parts per 100 parts of rubber, and preferably 2 parts to 20 parts.

A particle size d50 of the lignin is 1 μm to 10 μm, preferably 1 μm to 5 μm, and more preferably 2 μm to 4 μm.

The rubber is natural rubber.

Preferably, the lignin partially replaces the resorcinol; and further preferably, in parts by weight, an amount of the resorcinol is 0 part to 0.5 part per 100 parts of rubber.

1 part of the resorcinol is replaced by 3 parts to 10 parts of the lignin, and preferably, 1 part of the resorcinol is replaced by 5 parts of the lignin.

Preferably, after the lignin replaces the anti-aging agent, in parts by weight, an amount of the anti-aging agent is 0 part to 1 part per 100 parts of rubber; wherein, the anti-aging agent includes but is not limited to an anti-aging agent RD, an anti-aging agent MB, an anti-aging agent 4020, and an anti-aging agent DTPD.

The lignin is any one or a combination of several of an alkali lignin, a soda lignin, an organic solvent lignin and an enzymolysis lignin, or is a modified lignin prepared by modifying any one of an alkali lignin, a soda lignin, an organic solvent lignin and an enzymolysis lignin; wherein the modifying is any one or a combination of several of acylation, esterification, etherification, phenolization, alkylation, demethylation, amination, vulcanization and unsaturated functionalization. The alkali lignin, the soda lignin, the organic solvent lignin, and the enzymolysis lignin are all prepared by the method well known in the art; and various modification methods described in the prior art are applicable to the present invention.

Preferably, the lignin is a modified lignin; further preferably, the lignin is a modified lignin prepared by any one of amination, demethylation and vulcanization; and further preferably, the modified lignin is prepared by demethylation.

The radial tire further includes the following ingredients: a filler, a zinc oxide, an adhesion accelerator, a vulcanizing agent, an adhesive and a vulcanizing accelerator; and based on 100 parts of rubber, weight parts of the ingredients are as follows:

i. 45 parts to 65 parts of the filler;
ii. 6 part to 10 parts of the zinc oxide;
iii. 0.2 part to 1 part of the adhesion accelerator;
iv. 3 parts to 6 parts of the vulcanizing agent;
v. 4 parts to 8 parts of the adhesive; and
vi. 1 part to 3 parts of the vulcanizing accelerator.

The filler is any one or a combination of several of carbon black, white carbon black, calcium carbonate and titanium dioxide; and preferably carbon black.

The adhesive is RA-65 (HMMM).

The adhesion accelerator includes but is not limited to cobalt naphthenate, cobalt stearate and other fatty acid cobalt series, and preferably cobalt decanoate.

The vulcanizing agent includes but is not limited to bis-[γ-(triethoxy silicon)propyl]tetrasulfide, mercaptan, potassium persulfate, mercaptobenzothiazole, sulfur, and tetramethyl thiuram monosulfide; and preferably sulfur of OT-20.

The vulcanizing accelerator includes but is not limited to N,N-dicyclohexyl-2-benzothiazolsulfene amide DZ, zinc N,N-dibutylcarbamodithioate ZDBC(BZ), and 2,2'-dibenzothiazole disulfide) MBTS(DM).

Further preferably, the above radial tire further includes other auxiliary agents such as a scorch retarder.

A method for preparing the radial tire obtained by replacing the resorcinol by the lignin includes the following steps of:

(1) primary-stage plastifying: placing natural rubber in a mixing chamber of an internal mixer according to a formula ratio and pressing the same with a ram for 20 seconds to 50 seconds; and when the rubber material reaches a temperature of 160° C. to 170° C., discharging the rubber; wherein, a rotating speed of a rotor is 40 rpm to 65 rpm, and a pressure is 0.5 MPa to 0.8 MPa;

(2) secondary-stage mixing: placing the plastified rubber obtained in step (1), a filler, a zinc oxide, an adhesive, an adhesion accelerator and a lignin, or a mixture of the lignin and resorcinol, or a mixture of the lignin and an anti-aging agent, or a mixture of the lignin, the anti-aging agent and the resorcinol in the mixing chamber of the internal mixer and pressing the same with the ram for 30 seconds to 50 seconds; when the rubber material reaches a temperature of 115° C. to 130° C., lifting the ram for 20 seconds to 30 seconds, then putting the ram down for 20 seconds to 30 seconds for the second time, and lifting the ram for 5 seconds to 10 seconds for the second time; and when the rubber material reaches a temperature of 160° C. to 175° C., discharging the rubber; wherein, the rotating speed of the rotor is 50 rpm to 55 rpm, and the pressure is 0.5 MPa to 0.8 MPa;

(3) third-stage mixing: pressing the mixed rubber obtained in step (2) with the ram for 30 seconds to 40 seconds; when the rubber material reaches a temperature of 115° C. to 130° C., lifting the ram for 20 seconds to 30 seconds; and when the rubber material reaches a temperature of 140° C. to 150° C., discharging the rubber; wherein, the rotating speed of the rotor is 35 rpm to 50 rpm, and the pressure is 0.5 MPa to 0.8 MPa; and (4) final-stage refining: placing the mixed rubber obtained in step (3), a vulcanizing agent and a vulcanizing accelerator in the mixing chamber of the internal mixer and pressing the same with the ram for 40 seconds to 50 seconds, and then lifting the ram for 30 seconds to 40 seconds; and when the rubber material reaches a temperature of 90° C. to 100° C., discharging the rubber; wherein, the rotating speed of the rotor is 20 rpm to 40 rpm, and the pressure is 0.5 MPa to 0.8 MPa.

In step (1) to step (4), discharging the rubber lasts for no less than 4 hours.

In step (2), when only the lignin is added, the lignin completely replaces the anti-aging agent and the resorcinol; when the mixture of the lignin and the resorcinol is added, the lignin completely replaces the anti-aging agent and partially replaces the resorcinol; when the mixture of the lignin and the anti-aging agent is added, the lignin partially replaces the anti-aging agent and completely replaces the resorcinol; and when the mixture of the lignin, the anti-aging agent and the resorcinol is added, the lignin partially replaces the anti-aging agent and partially replaces the resorcinol.

The radial tire prepared by the above method also falls within the scope of protection of the present invention.

Beneficial effects: compared with the prior art, the present invention has the following advantages.

(1) The price of the resorcinol is 110,000 RMB per ton, which is expensive. Moreover, the resorcinol is easy to be sublimated during internal mixing and toxic. Therefore, the resorcinol is replaced or partially replaced by a biomass-derived lignin or a modified lignin in the present invention, so that requirements of cost reduction, environmental protection and no toxicity are satisfied.

(2) In the present invention, the lignin is used as a thermo-oxidative aging agent to improve a thermo-oxidative aging property of a rubber product, and an aging change rate is obviously lower than that of the radial tire without the lignin.

(3) The lignin modified by demethylation according to the present invention is capable of effectively enhancing various properties of the rubber, especially a steel drawing property.

DETAILED DESCRIPTION OF INVENTION

In the following embodiments, the manufacturers of various substances are as follows: natural rubber comes from 3TREES; carbon black is rubber carbon black N234 of Tianjin Yihuilong; anti-aging agents are rubber anti-aging agents RD and MB of Shijiazhuang Youfa and 4020 of Nanhua; a brand of a zinc oxide is Shaoye Nanhua; cobalt bromate and cobalt stearate are from Jiangxi Jialong New Material; sulfur is OT20 of Henan Kailun Chemical Co., Ltd.; an adhesive is RA-65 of Jiangsu National Chemical Technology Co., Ltd.; vulcanizing accelerators are MBTS (DM) and MDB of Longji Chemical; resorcinol is resorcinol-80 of Henan Mingzhixin; an enzymolysis lignin[1], an alkali lignin[2], a soda lignin[3] and an organic solvent lignin (acetic acid lignin)[4] are respectively prepared from corn stalks (produced in Lianyungang, Jiangsu) according to the prior art; and modification of the acetic acid lignin by esterification[5], amination[6], demethylation[7] and vulcanization also belongs to the prior art. Before use, all the above lignins and modified lignins are pulverized by an air flow until a particle size d50 is about 3.8 μme.

A preparation method of a lignin modified by vulcanization is as follows: soaking and dispersing 3-mercaptopropyl triethoxysilane (8 g/mL) in ethanol to obtain a first solution; and then dispersing the lignin in ethanol until the lignin reaches a soaked state to obtain an ethanol solution of the lignin, and then standing and drying the ethanol solution of the lignin; wherein, an amount of the 3-mercaptopropyl triethoxysilane is 2 wt % of the lignin.

Embodiment 1

Basic formula: 100 parts of natural rubber; filler: 55 parts of carbon black N234; anti-aging agent: 0.3 part of RD and 1 part of 4020; 10 parts of zinc oxide; adhesion accelerator: 1 part of cobalt decanoate; vulcanizing agent: 6 parts of sulfur OT20; adhesive: 4 parts of RA-65; and vulcanizing accelerator: 2 parts of MBTS(DM), wherein the vulcanizing accelerator also included resorcinol-80 and an enzymolysis lignin, and amounts of the two were shown in Table 1.

A preparation technology was as follows:

(1) primary-stage plastifying: placing the natural rubber in a mixing chamber of an internal mixer according to a formula ratio and pressing the same with a ram for 40 seconds; and when the rubber material reached a temperature of 160° C. to 170° C., discharging the rubber; wherein, a rotating speed of a rotor was 50 rpm, and a pressure was 0.7 MPa;

(2) secondary-stage mixing: placing the plastified rubber obtained in step (1), the filler, the anti-aging agent, the zinc oxide, the adhesive, the adhesion accelerator and the resorcinol, or a mixture of the enzymolysis lignin and the resorcinol, or the enzymolysis in the mixing chamber of the internal mixer and pressing the same with the ram for 40 seconds; when the rubber material reached a temperature of 115° C. to 120° C., lifting the ram for 20 seconds, then putting down the ram for 20 seconds for the second time, and lifting the ram for 5 seconds for the second time; and when the rubber material reached a temperature of 160° C. to 175° C., discharging the rubber; wherein, the rotating speed of the rotor was 50 rpm, and the pressure was 0.6 MPa;

(3) third-stage mixing: pressing the mixed rubber obtained in step (2) with the ram for 40 seconds; when the rubber material reached a temperature of 115° C. to 130° C., lifting the ram for 30 seconds; and when the rubber material reached a temperature of 140° C. to 150° C., discharging the rubber; wherein, the rotating speed of the rotor was 50 rpm, and the pressure was 0.6 MPa; and (4) final-stage refining: placing the mixed rubber obtained in step (3), the vulcanizing agent and the vulcanizing accelerator in the mixing chamber of the internal mixer and pressing the same with the ram for 40 seconds, and then lifting the ram for 30 seconds; and when the rubber material reached a temperature of 90° C. to 100° C., discharging the rubber; wherein, the rotating speed of the rotor was 40 rpm, and the pressure was 0.6 MPa.

Products prepared by the above method were tested by a conventional test method commonly used in the field of tires, and a steel drawing property was tested according to "GBT16586-1996 Determination of Adhesion Strength between Vulcanized Rubber and Steel Cord". Test results were shown in Table 1:

TABLE 1

| | Dosages of resorcinol and enzymolysis lignin | | | | | | |
|---|---|---|---|---|---|---|---|
| Embodiment | 1-1 | 1-2 | 1-3 | 1-4 | 1-5 | 1-6 | 1-7 |
| Enzymolysis lignin | / | 5 parts | 10 parts | 15 parts | 5 parts | 10 parts | 15 parts |
| Resorcinol | 1.5 parts | 0.5 part | 0.5 part | 0.5 part | 0 part | 0 part | 0 part |
| | Tensile property (151° C. × 30 min) | | | | | | |
| M100/MPa | 3.8 | 4.3 | 4.2 | 4.7 | 3.9 | 4.0 | 4.4 |
| M300/MPa | 17.3 | 17.1 | 15.8 | 15.7 | 15.4 | 15.6 | 15.6 |
| Tensile strength at break (TB/MPa) | 23.6 | 23.0 | 21.3 | 22.6 | 23.7 | 20.9 | 21.3 |
| Elongation at break (EB/%) | 399 | 406 | 402 | 402 | 412 | 393 | 400 |
| Hardness (HS) | 72 | 72 | 76 | 74 | 73 | 72 | 73 |
| Steel drawing/N/mm | 694 | 721 | 751 | 739 | 693 | 707 | 699 |

It can be seen from Table 1 that: (1) when the resorcinol is partially or completely replaced by the lignin, the tensile strength at break and the M300 of the obtained product are slightly reduced, but other properties are maintained at the same level, and the steel drawing property is improved to some extent. (2) According to different replacement amounts of the lignin in Embodiments 1-1 to 1-4, when 1 part of the resorcinol is replaced by 5 parts of the lignin, the overall property is optimum. Thus, it can be seen that, when 5 parts of the lignin is used (Embodiment 1-2), the lignin can effectively replace the resorcinol for preparing the radial tire. (3) It can be seen from Embodiments 1-5 to 1-7 that, when the lignin completely replaces the resorcinol, the overall property is lower than that of partial replacement, but compared with Embodiment 1-1, the overall properties have little difference, and the steel drawing property is significantly improved. Thus, it can be seen that the enzymolysis lignin may completely replace the resorcinol to be applied in the radial tire.

Embodiment 2: similar to Embodiment 1-2, only the enzymolysis lignin was pulverized to different particle sizes by an air flow, and the detection results were shown in Table 2.

TABLE 2

| | Embodiment | | | | |
|---|---|---|---|---|---|
| | 3.8 μm (1-2) | 1.8 μm (2-2) | 5.0 μm (2-3) | 7.8 μm (2-4) | 9.0 μm (2-5) |
| | Tensile strength (151° C. × 30 min) | | | | |
| M100/MPa | 4.3 | 4.6 | 4.2 | 4.2 | 3.8 |
| M300/MPa | 17.1 | 17.2 | 17.1 | 16.9 | 15.9 |
| Tensile strength at break (TB/MPa) | 23.0 | 23.4 | 22.5 | 22.6 | 21.8 |
| Elongation at break (EB/%) | 406 | 408 | 405 | 404 | 396 |
| Hardness (HS) | 72 | 74 | 73 | 72 | 70 |
| Steel drawing/N/mm | 721 | 726 | 718 | 717 | 689 |

Note: the particle size above refers to d50.

It can be seen from Table 2 that with the decrease of the particle size of the lignin, the products have a better property; wherein, when the particle size of the lignin exceeds 8 μm, the property is decreased greatly; when the particle size of the lignin is 1.8 μm, the property is optimum; and when the particle size of the lignin is 3.8 μm, the overall property is similar to that in the case of 1.8 μm. Moreover, in the experimental process, if the lignin is pulverized to 1.8 μm by an air flow, an output per hour is low and the energy consumption is high. Therefore, from of the aspect of cost and property, the particle size of the lignin should be 1 μm to 5 μm on the whole.

Embodiment 3

3.1: similar to Embodiment 1-2, only the enzymolysis lignin in Embodiment 1-2 was replaced by an alkali lignin (3-1), a soda lignin (3-2) and an organic solvent lignin (acetic acid lignin) (3-3), and the detection results were shown in Table 5.

3.2: similar to Embodiment 1-5, only the enzymolysis lignin in Embodiment 1-5 was replaced by an acetic acid lignin (3-4), and the detection results were shown in Table 3.

TABLE 3

| | Embodiment | | | |
|---|---|---|---|---|
| | Alkali lignin (3-1) | Soda lignin (3-2) | Acetic acid lignin (3-3) | Complete replacement by acetic acid lignin (3-4) |
| | Tensile property (151° C. × 30 min) | | | |
| M100/MPa | 4.0 | 4.2 | 4.5 | 4.3 |
| M300/MPa | 16.5 | 16.9 | 17.8 | 17.1 |
| Tensile strength at break (TB/MPa) | 22.3 | 23.1 | 24.2 | 23.0 |
| Elongation at break (EB/%) | 410 | 409 | 400 | 406 |
| Hardness (HS) | 73 | 74 | 78 | 72 |
| Steel drawing/N/mm | 720 | 718 | 732 | 721 |

It can be seen from Table 3 that the acetic acid lignin can effectively replace the resorcinol, when 5 parts of the acetic acid lignin replaces 1 part of the resorcinol, the tensile strength at break can be at the same level as that in Embodiment 1-1 (complete resorcinol without replacement by the lignin), and other properties are also better than those in Embodiment 1-1, especially the steel drawing property reaches 732 N/mm, so that a new method for preparing the radial tire is developed.

Embodiment 4

The acetic acid lignin was modified by esterification (4-1), amination (4-2), demethylation (4-3) and vulcanization (4-4), and the modified lignin was applied in preparation of the radial tire, that is, it was identical to Embodiment 3-3, only the organic solvent lignin was respectively replaced by the lignin modified by esterification, amination, demethylation and vulcanization, and the detection results were shown in Table 4.

TABLE 4

| | Embodiment | | | | |
|---|---|---|---|---|---|
| | Acetic acid lignin (3-3) | Esterification (4-1) | Amination (4-2) | Demethylation (4-3) | Vulcanization (4-4) |
| | Tensile property (151° C. × 30 min) | | | | |
| M100/MPa | 4.5 | 4.6 | 4.7 | 5.2 | 4.9 |
| M300/MPa | 17.8 | 17.5 | 17.6 | 18.9 | 18.0 |
| Tensile strength at break (TB/MPa) | 24.2 | 24.7 | 25.2 | 26.2 | 25.6 |

TABLE 4-continued

| | Embodiment | | | | |
|---|---|---|---|---|---|
| | Acetic acid lignin (3-3) | Esterification (4-1) | Amination (4-2) | Demethylation (4-3) | Vulcanization (4-4) |
| | Tensile property (151° C. × 30 min) | | | | |
| Elongation at break (EB/%) | 400 | 397 | 396 | 393 | 395 |
| Hardness (HS) | 78 | 78 | 78 | 80 | 79 |
| Steel drawing/N/mm | 732 | 734 | 731 | 734 | 732 |

It can be seen from Table 4 that after the lignin is modified, the tensile property is improved to some extent, but there is little influence on the steel drawing property. The effect after modification by demethylation is optimum, followed by vulcanization, while there is little improvement on the modification by amination and esterification.

Embodiment 5

Similar to Embodiment 4-3, the dosages of the lignin and the resorcinol-80 in the formula and the detection results were shown in Table 5.

TABLE 5

| Embodiment | 1-1 | 4-3 | 5-3 | 5-4 | 5-5 | 5-6 | 5-7 | 5-8 |
|---|---|---|---|---|---|---|---|---|
| Demethylated lignin | 0 part | 5 parts | 10 parts | 15 parts | 5 parts | 10 parts | 15 parts | 20 parts |
| Resorcinol | 1.5 parts | 0.5 part | 0.5 part | 0.5 part | 0 part | 0 part | 0 part | 0 part |
| | Tensile property (151° C. × 30 min) | | | | | | | |
| M100/MPa | 3.8 | 5.2 | 5.1 | 5.6 | 4.6 | 4.8 | 4.9 | 4.4 |
| M300/MPa | 17.3 | 18.9 | 18.6 | 18.7 | 17.2 | 18.3 | 17.6 | 16.2 |
| Tensile strength at break (TB/MPa) | 23.6 | 26.2 | 25.4 | 25.6 | 25.4 | 26.1 | 27.6 | 28.1 |
| Elongation at break (EB/%) | 399 | 393 | 392 | 393 | 401 | 396 | 393 | 397 |
| Hardness (HS) | 72 | 80 | 82 | 83 | 82 | 83 | 81 | 76 |
| Steel drawing/N/mm | 694 | 734 | 775 | 739 | 719 | 731 | 721 | 717 |

It can be seen from Table 5 that after the acetic acid lignin is modified by demethylation, the overall property is better than that of the radial tire (1-1) prepared from original resorcinol, and when the resorcinol is completely replaced by 20 parts of the demethylated acetic acid lignin, compared with other dosages, the property is decreased to some extent, but the property is still better than that of 1-1 on the whole. Thus, it can be seen that the formula of 5-8 may be selected to further reduce the cost on the whole.

Embodiment 6

Basic formula: 100 parts of natural rubber; filler: 55 parts of carbon black N234; 10 parts of zinc oxide; adhesion accelerator: 1 part of cobalt decanoate; vulcanizing agent: 6 parts of sulfur OT20; adhesive: 4 parts of RA-65; and vulcanizing accelerator: 2 parts of MBTS (DM), wherein the formula also included resorcinol-80, anti-aging agents (RD and 4020), and an enzymolysis lignin, and dosages of the three were shown in Table 1.

TABLE 6

| Embodiment | 1-1 | 1-2 | 6-3 | 6-4 | 6-5 | 6-6 | 6-7 |
|---|---|---|---|---|---|---|---|
| Anti-aging agent | 0.3 part of RD and 1 part of 4020 | 0.3 part of RD and 1 part of 4020 | / | / | / | / | 0.1 part of RD and 0.5 part of 4020 |
| Lignin | / | 5 parts of enzymolysis lignin | 5 parts of enzymolysis lignin | 5 parts of vulcanized acetic acid lignin | 10 parts of enzymolysis lignin | 15 parts of enzymolysis lignin | 5 parts of enzymolysis lignin |
| Resorcinol | 1.5 parts | 0.5 part | 0.5 part | 0.5 part | 0.5 part | 0.5 part | 0.5 part |
| Tensile property (151° C. × 30 min) | | | | | | | |
| M100/MPa | 3.8 | 4.3 | 4.3 | 5.2 | 4.4 | 4.7 | 4.4 |
| M300/MPa | 15.2 | 17.1 | 17.0 | 18.8 | 16.8 | 16.7 | 17.0 |
| Tensile strength at break (TB/MPa) | 23.6 | 23.0 | 23.2 | 26.4 | 22.1 | 22.6 | 23.1 |
| Elongation at break (EB/%) | 399 | 406 | 403 | 396 | 400 | 402 | 405 |
| Hardness (HS) | 72 | 72 | 74 | 77 | 77 | 74 | 74 |
| Steel drawing/N/mm | 694 | 721 | 719 | 723 | 754 | 740 | 720 |
| Tensile property test after aging (vulcanizing at 151° C. for 30 minutes, then standing at 100° C. for 48 hours) | | | | | | | |
| M100 | 8.8 | 8.7 | 8.1 | 9.6 | 8.7 | 9.3 | 8.7 |
| M300 | 7.6 | 8.9 | 8.2 | 9.6 | 8.9 | 8.9 | 8.8 |
| Tensile strength at break (TB/MPa) | 9.9 | 10.9 | 10.1 | 11.5 | 10.3 | 11.3 | 10.5 |
| Elongation at break (EB/%) | 101 | 123 | 110 | 110.6 | 122 | 131 | 121 |
| Hardness (HS) | 82 | 86 | 83 | 86 | 88 | 87 | 85 |
| Change rate before and after aging/% = (property after change − property before change)/property before change *100% | | | | | | | |
| M100 | 131.58 | 102.33 | 88.37 | 84.62 | 97.73 | 97.87 | 97.73 |
| M300 | −50.00 | −47.95 | −51.76 | −48.94 | −47.02 | −46.71 | −48.24 |
| Tensile strength at break (TB/MPa) | −58.05 | −52.61 | −56.47 | −56.44 | −53.39 | −50.00 | −54.55 |
| Elongation at break (EB/%) | −74.69 | −69.70 | −72.70 | −72.06 | −69.50 | −67.41 | −70.12 |
| Hardness (HS) | 13.89 | 16.22 | 12.16 | 11.69 | 14.29 | 17.57 | 14.86 |

It can be seen from Table 6 that: (1) when the lignin and the anti-aging agent exist at the same time in Embodiments 1-1, 1-2, 6-3 and 6-4, after aging, the M300 and the tensile strength at break are decreased at a minimum, and the hardness is increased most obviously, which indicates that the anti-aging property is optimum when the two exist at the same time; (2) it can be seen from the comparison between Embodiments 6-3 and 6-4 that different lignins have no great influence on the aging property; (3) with the increase of the number of parts of the lignin, the anti-aging property is also improved to some extent; and (4) it can be seen from Embodiments 1-2, 6-2 and 6-7 that after the lignin partially replaces the anti-aging agent, the anti-aging property is better than that in the case that the lignin completely replaces the anti-aging agent.

[1] Qi Pan, Jienan Chen, Xinming Zhang et al. Extraction and characterization of enzymolysis lignin from residues of cellulose ethanol fermentation [J]. Chemical Industry and Engineering Progress, 2015, 34: 86-90.
[2] Tang C, Shan J, Chen Y, et al. Organic amine catalytic organosols pretreatment of corn stover for enzymatic saccharification and high-quality lignin[J]. Bioresource Technology, 2017: 222-228.
[3] Jie He and Zhong Liu. Delignification reaction process of hemp stalk core caustic soda-anthraquinone pulping [J]. China Pulp & Paper, 2011(06): 45-50.
[4] CN101323632A—Method for preparing acetic acid lignin by microwave irradiation.
[5] Jie Wang, Na Feng, Ligang Wei, et al. Esterification of lignin in ionic liquid and modification of epoxy resin [J]. Synthetic resin and plastic, 2014, 31(5): 39-40.
[6] Xiaohong Wang, Yuhua Ma, Jing Liu, et al. Modification of lignin by amination [J]. China Pulp & Paper, 2010, 29(6): 42-45.
[7] CN111286041A Demethylated lignin and preparation method thereof and application in phenolic resin adhesive.

The present invention provides an idea and a method for a radial tire and a preparation method thereof, with many methods and ways to realize the technical solution specifically. Those described above are merely the preferred embodiments of the present invention, and it should be pointed out that those of ordinary skills in the art may further make improvements and decorations without departing from the principle of the present invention, and these improvements and decorations should also be regarded as the scope of protection of the present invention. All unspecified components in the embodiments can be implemented in the prior art.

What is claimed is:

1. A method for preparing a radial tire with a lignin comprising a step of mixing the lignin in the radial tire; wherein the lignin is a modified lignin prepared by modifying an acetic acid lignin; the modifying is a demethylation or a vulcanization; wherein M100 is 4.9-5.2 MPa, M300 is 18.0-18.9 MPa, a tensile strength of the radial tire at break is 25.6-26.2 TB/MPa, hardness is 79-80 HS.

2. The method according to claim 1, wherein the lignin completely or partially replaces a resorcinol in preparing the radial tire.

3. The method according to claim 2, wherein the lignin completely or partially replaces an anti-aging agent in preparing the radial tire.

4. The method according to claim 3, wherein in parts by weight, an amount of the anti-aging agent is 0 part to 1 part per 100 parts of rubber.

5. The method according to claim 2, wherein in parts by weight, an amount of the resorcinol is 0 part to 0.5 part per 100 parts of rubber.

6. The method according to claim 5, wherein the radial tire further comprises the following ingredients: a filler, a zinc oxide, an adhesion accelerator, a vulcanizing agent, an adhesive and a vulcanizing accelerator.

7. The method according to claim 6, wherein based on 100 parts of rubber, weight parts of the ingredients are as follows:
   45 parts to 65 parts of the filler;
   6 part to 10 parts of the zinc oxide;
   0.2 part to 1 part of the adhesion accelerator;
   3 parts to 6 parts of the vulcanizing agent;
   4 parts to 8 parts of the adhesive; and
   1 part to 3 parts of the vulcanizing accelerator.

8. The method according to claim 1, wherein the lignin completely or partially replaces an anti-aging agent in preparing the radial tire.

9. The method according to claim 8, wherein in parts by weight, an amount of the anti-aging agent is 0 part to 1 part per 100 parts of rubber.

10. The method according to claim 1, wherein in parts by weight, an amount of the lignin is 2 parts to 25 parts per 100 parts of rubber; wherein a particle size d50 of the lignin is 1 μm to 10 μm.

\* \* \* \* \*